United States Patent [19]

Kimura et al.

[11] Patent Number: 4,965,733
[45] Date of Patent: Oct. 23, 1990

[54] CUTTING APPARATUS FOR SHEET-LIKE MATERIALS

[75] Inventors: Hidetoshi Kimura; Hiroki Toya, both of Kodaira, Japan

[73] Assignee: Bridgestone Corporation, Tokyo, Japan

[21] Appl. No.: 298,146

[22] Filed: Jan. 18, 1989

[30] Foreign Application Priority Data

Jan. 18, 1988 [JP] Japan .................................. 63-6788

[51] Int. Cl.⁵ .................... B26D 1/18; B29D 30/46
[52] U.S. Cl. ............................. 364/474.09; 83/76.6; 83/486; 83/487; 83/581; 83/614
[58] Field of Search ............... 83/56, 614, 925 R, 581, 83/72, 485, 486, 487, 76.1, 76.6, 318, 368; 364/474.09

[56] References Cited

U.S. PATENT DOCUMENTS

| 4,210,042 | 7/1980 | Felten | 83/49 |
| 4,824,515 | 4/1989 | Still et al. | 83/614 X |

FOREIGN PATENT DOCUMENTS

| 46-8584 | 3/1971 | Japan . |
| 48-60780 | 8/1973 | Japan . |
| 49-11107 | 3/1974 | Japan . |
| 49-74283 | 7/1974 | Japan . |
| 49-99864 | 8/1974 | Japan . |
| 59-196192 | 11/1974 | Japan . |
| 51-47983 | 4/1976 | Japan . |
| 55-112792 | 8/1980 | Japan . |
| 58-138616 | 9/1983 | Japan . |
| 580203033 | 11/1983 | Japan . |
| 60-94297 | 5/1985 | Japan . |
| 60-109895 | 7/1985 | Japan . |
| 60-221294 | 11/1985 | Japan . |
| 62-7533 | 1/1987 | Japan . |
| 62-48493 | 3/1987 | Japan . |
| 62-13779 | 4/1987 | Japan . |
| 62-53911 | 4/1987 | Japan . |

Primary Examiner—Douglas D. Watts
Assistant Examiner—Eugenia A. Jones
Attorney, Agent, or Firm—Sughrue, Mion, Zinn, Macpeak & Seas

[57] ABSTRACT

A cutting apparatus for sheet-like materials comprises a traveling mechanism having a traveling support member movable above a sheet-like material, a cutting device hanged from the traveling support member of the traveling mechanism and movable in directions perpendicular to traveling directions of the traveling support member, a first detecting device for detecting positions of the cutting device in the traveling directions of the traveling support member, a second detecting device for detecting positions of the cutting device in directions perpendicular to the traveling directions of the traveling support member, and an arithmetic unit for arithmetically operating positions of the cutting device on co-ordinates with the aid of signals from the first and second detecting devices.

10 Claims, 6 Drawing Sheets

CUTTING APPARATUS FOR SHEET-LIKE MATERIALS

BACKGROUND OF THE INVENTION

This invention relates to a cutting apparatus for sheet-like materials such as rubber sheets, and more particularly to a sheet-like material cutting apparatus having means for detecting configurations of cut ends of the rubber sheets having cords embedded therein in parallel with each other when the sheets are cut.

There have been various kinds of apparatus for cutting rubber sheet materials such as carcass materials, steel breakers and the like. For example, a cutting apparatus has been proposed which is able to cut steel breakers in bias directions of steel cords embedded therein without cutting the steel cords or without exposing the cords at cut ends (Japanese Utility Model Application Publication No. 62-13,779).

With the apparatus of the prior art, a disk-like cutter having a V-shaped section is driven in the bias directions on the rubber sheet to cut it diagonally. The cutter is movable in the bias directions and also directions perpendicular thereto.

Therefore, the V-shaped cutting blade of the cutter moves so as to avoid the embedded steel cords so that any steel cords are not cut. Moreover, the V-shaped cutting blade presses and deforms the sheet material and cut the material so as to cover the cut end of the material by its outer coating. Accordingly, steel cords are not exposed at the atmosphere.

Since the steel cords are not exposed at the cut ends, where both the ends abut against each other and are jointed, a complete joint of the ends can be established and any peeling of the jointed portions is prevented.

In general, rubber sheet materials are stocked in rolled condition in a supply process and a required amount of the material is paid out of the roll and cut in use.

Therefore, cords embedded in the rubber sheet materials would lose their straightness and their bias angles would be changed by bad stocked conditions and mishandling in paying off.

In case of the above apparatus (The Japanese Utility Model Application Publication No. 62-13,779), even if cords in rubber sheet materials are curved or bias angles are changed, the cutter is moved along the cords without cutting the cords because the cutter is movable in a direction perpendicular to its traveling direction.

However, it is impossible to avoid problems when cutting configurations of the rubber sheet materials are curved or bias angles are different from predetermined bias angles after being cut.

Therefore, if the such a cut rubber sheet material is supplied to a next process, various troubles would occur.

In more detail, if the rubber sheet material is wound about a drum to joint its abutting cut ends of the material in the next process, the cut ends are often overlap or form clearances therebetween to lower the quality of the tire product.

In a process of jointing cut ends of a rubber sheet material in overlapping, moreover, such a rubber sheet material having curved cut ends and different bias angles also lowers the quality of the tire product for the above reason such as existence of non-uniform overlapped ends and, in the worst case, partial clearances.

SUMMARY OF THE INVENTION

It is a primary object of the invention to provide an improved cutting apparatus for sheet-like materials which eliminates all the disadvantages of the prior art and which is able to detect configurations of cut ends of the sheet-like material in a cutting process so as to provide detected informations to following processes.

In order to achieve the object, the cutting apparatus for sheet-like materials according to the invention comprises traveling means having a traveling support member movable above a sheet-like material, cutting means hanged from said traveling support member of the traveling means and movable in directions perpendicular to traveling directions of the traveling support member, first detecting means for detecting positions of said cutting means in the traveling directions of the traveling support member, second detecting means for detecting positions of said cutting means in directions perpendicular to said traveling directions of the traveling support member, and arithmetic means for arithmetically computing positions of said cutting means to co-ordinates with the aid of signals from said first and second detecting means.

The cutting means is traveled by the traveling supporting member driven by the traveling means to cut the sheet-like material.

In this case, the cutting means is movable in the traveling direction and the direction perpendicular thereto. Positions of the cutting means in the traveling and the perpendicular directions are detected by the first and second detecting means. The arithmetic unit means arithmetically operates the detected informations to obtain positions of the cutting means on co-ordinates, thereby detecting and obtaining configurations of cut ends of the material at the same time when the material is cut.

Therefore, all the configurations of the cut ends of the material are confirmed so that in the following processes attaching operation can be carried out to meet the confirmed configurations of the cut ends in jointing the cut ends so that faulty products can be eliminated such as overlapping of the cut ends and formation of clearances between jointed cut ends.

Moreover, since the cutting means is movable in the directions perpendicular to the traveling directions, with sheet-like materials having cords embedded therein, there is no problem such as cutting off or exposing of the cords.

The invention will be more fully understood by referring to the following detailed specification and claims taken in connection with the appended drawings.

EXPLANATION OF PREFERRED EMBODIMENT

A cutting apparatus 1 in the embodiment of the invention is intended to obliquely cut steel breaker members 2 to be used in a tire on a belt conveyor 4.

The steel breaker member 2 includes a large number of steel cords 3 which are embedded in the steel breaker member 2 and having a constant bias angle made with a longitudinal direction of the steel breaker member 2. The steel breaker member 2 is cut in bias directions along the steel cords 3.

Figure 1:
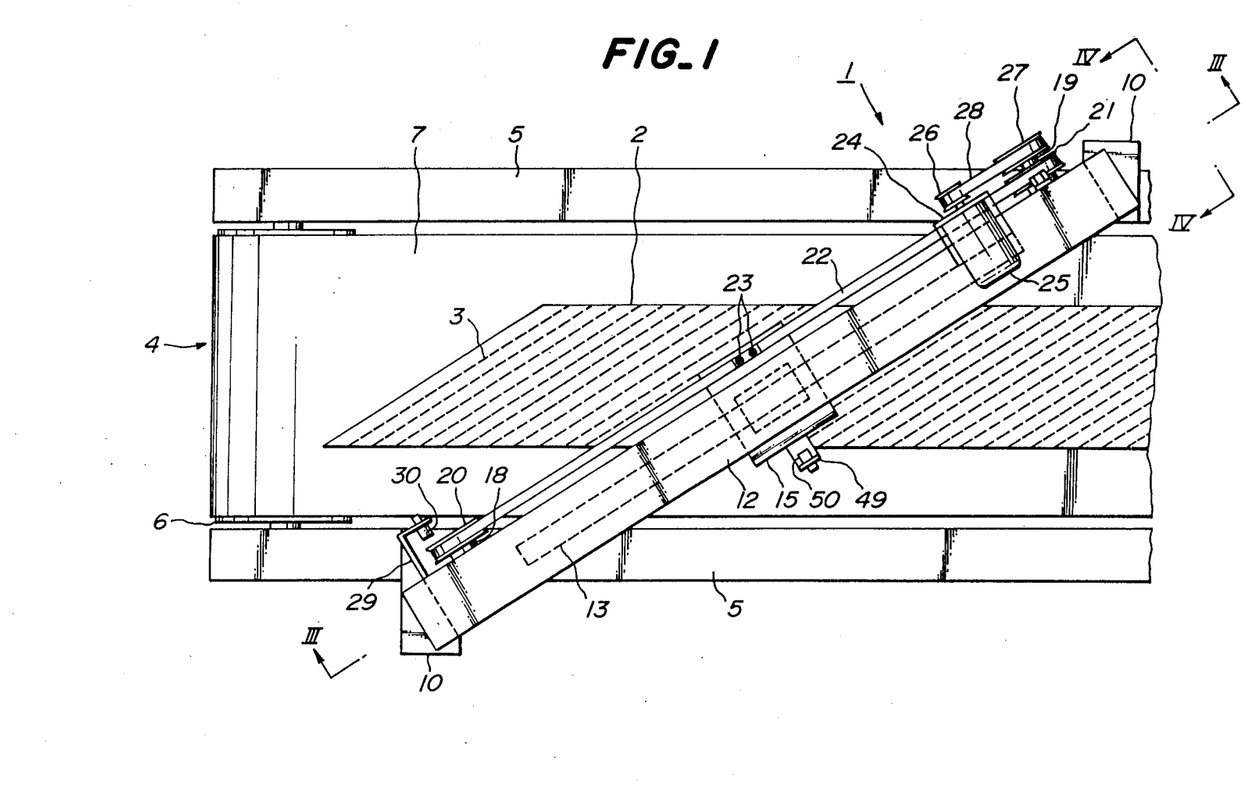
FIG. 1 is a plan view of one embodiment of the cutting apparatus according to the invention.
Figure 2:
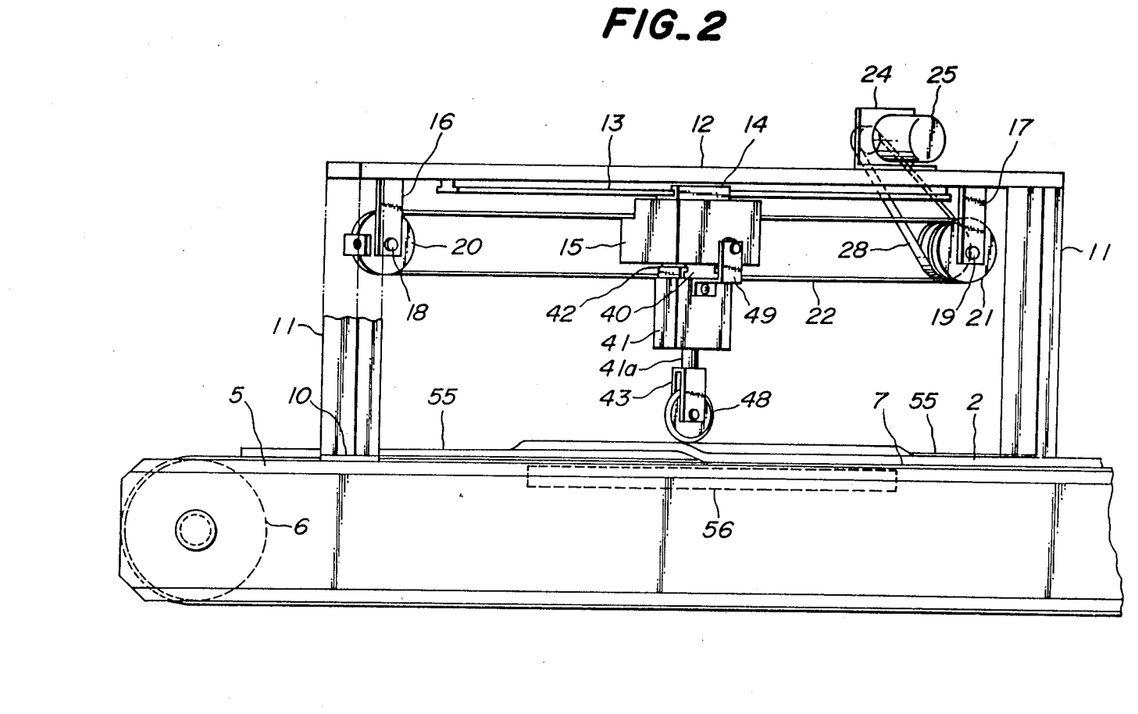
FIG. 2 is a front elevational of the apparatus shown in FIG. 1.

FIGS. 1 and 2 are a plan view and a side view of the cutting apparatus and the belt conveyor 4.

The belt conveyor 4 is supported by frames 5 on both sides of the conveyor 4. A conveyor belt 7 of the belt conveyor 4 is extended about rollers 6 provided at front and rear ends of the frames 5. The belt-like steel breaker member 2 is arranged on an upper run of the conveyor belt 7 and transferred into a front direction (to the left side viewed in FIG. 1).

On the frames 5 on both sides are upstandingly provided columns 11 longitudinally shifted and through support plates 10 interposed therebetween. A horizontal support plate 12 is bridged between the columns 11 on the front and rear sides.

The horizontal support plate 12 is provided with a cutting tool traveling mechanism secured thereto and is arranged so that a longitudinal axis of the horizontal support plate 12 forms an angle with an advancing direction of the conveyor belt 7. The angle is coincident with a standard value of the bias angle of the steel cords 3 of the steel breaker member 2 to be transferred on the conveyor belt 7.

A linear ball slide guide rail 13 is arranged on an underside of the horizontal support plate 12 in its longitudinal direction. A linear ball slide guide 14 is slidably fitted on the linear ball slide guide rail 13. A traveling support member 15 is fixed to an underside of the linear ball slide guide 14.

Pivotal base plates 16 and 17 hang from the horizontal support plate 12 at front and rear ends on a side remote from the surface of the drawing FIG. 2. To lower ends of the pivotal base plates 16 and 17 are pivotally connected a rotating shaft 18 fixed to a driven pulley 20 and a rotating shaft 19 fixed to a driving pulley 21, respectively. A toothed or cog endless belt 22 extends about both the pulleys 20 and 21 and a predetermined portion of an upper run of the belt 22 is fixed to the traveling support member 15 by means of set screws 23.

A motor 25 supported by a support plate 24 is provided on the horizontal support plate 12 in the proximity of the driving pulley 21. A pulley 26 is fitted on a driving shaft of the motor 25. A pulley 27 is fitted on an extension of the rotating shaft 19 of the driving pulley 21 in alignment thereof. A toothed or cog belt 28 extends about the pulleys 26 and 27.

Therefore, when the motor 25 is energized to rotatively drive the driving pulley 21 through the toothed belt 28, the rotation of the driving pulley 21 causes the toothed belt 22 to rotate so as to drive the traveling support member 15 along the rail 13 through the slide guide 14 at the upper end of the traveling support member 15.

An L-shaped sensor bracket 29 extends forwardly from an inner surface of the column 11 on the side of and at the same level as the driven pulley 20. The bracket 29 is bent at its free end so that a surface of the bent portion is in opposition to the driven pulley 20. A reflection type photosensor 30 is fixed to the bent portion of the bracket 29 (FIG. 1).

Figure 5:
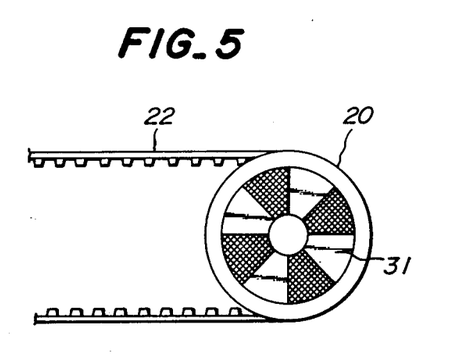
FIG. 5 is a front view of a driven pulley of the apparatus shown in FIG. 1.

To the front surface of the driven pulley 20 is attached a reflecting tape 31 having reflecting and non-reflecting portions alternately arranged in eight areas of a circle equally radially divided as shown in FIG. 5. With this arrangement, when the driven pulley 20 is rotated, intensity of the light beams reflected on the reflection type photosensor 30 is changed dependent on rotated positions of the driven pulley 20.

Therefore, when the driven pulley 20 is rotated by movement of the traveling support member 15 or rotation of the toothed belt 22, the reflection type photosensor 30 detects the rotated conditions of the driven pulley 20 so that the number of changes in detected value is counted to detect the moved position of the traveling support member 15.

The above constructions are the traveling mechanism and the traveling position detecting mechanism. The traveling support member 15 of the traveling mechanism is provided with the cutting tool hanging therefrom.

A rail 40 of a ball slide table 42 is provided on an under surface of the traveling support member 15 in a direction perpendicular to the traveling direction of the traveling support member 15. A cylinder 41 is fixed to an under surface of the ball slide table 42 slidably fitted on the rail 40. The cylinder 41 hangs below the traveling support member 15 and is slidable in a direction perpendicular to the traveling direction of the traveling support member 15.

The cylinder 41 extends below its cylinder rod 41a whose lower end is provided with a U-shaped cutter bracket 43 fixed thereto. A bolt 44 horizontally extends through legs of the U-shaped cutter bracket 43 and is fixed thereto by means of nuts 46 through washers 45.

A disc-like cutter 48 is positioned on the bolt 44 at its center by means of spacers 47 on both sides and is rotatably supported.

Therefore, the cutter 48 is rotatably supported on the U-shaped cutter bracket 43 and is adapted to be raised and lowered by extending and retracting of the cylinder rod 41a. Moreover, the cutter 48 is movable in the traveling direction of the traveling support member 15, and is also movable in a direction perpendicular to the traveling direction of the traveling support member 15.

A sensor bracket 49 is extended from a rear surface of the cylinder 41 rearwardly and its extended end is bent upwardly so as to be in opposition to a rear side surface of the traveling support member 15. A distance photosensor 50 is secured to the bent portion of the sensor bracket 49 in opposition to the traveling support member 15.

Therefore, the distance photosensor 50 is moved together with the cylinder 41 in the direction perpendicular to the traveling direction of the traveling support member 15 so that the photosensor 50 can detect distances between the photosensor and the traveling support member 15 at will.

Accordingly, the reflection type photosensor 30 detects positions of the cutter 48 in the traveling direction, and the distance photosensor 50 detects the positions of the cutter 48 in the direction perpendicular to the traveling direction.

Figure 6:
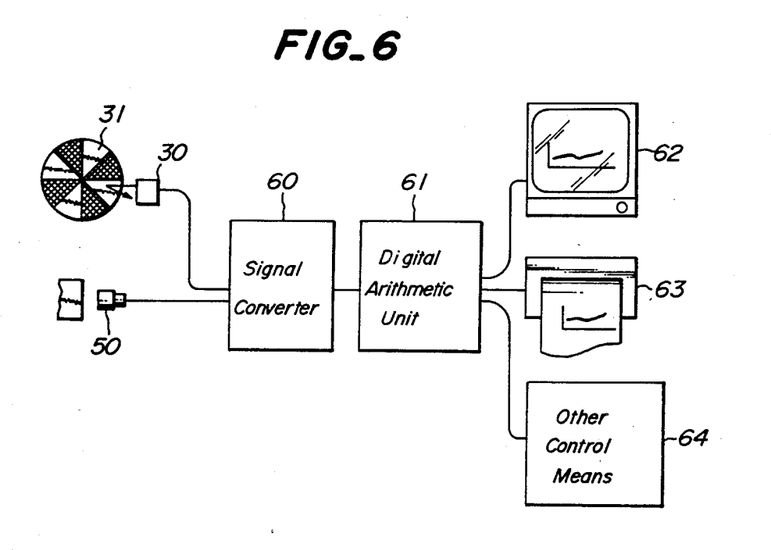
FIG. 6 is a block diagram of an electric system used in the apparatus shown in FIG. 1.

Detected signals of the reflection type photosensor 30 and distance sensor 50 are inputted into a signal converter 60 in which the detected signals are converted into digital signals. The digital signals are further inputted into a digital arithmetic unit 61 to arithmetically obtain the co-ordinates of the cutter 48.. Results in the form of co-ordinates are represented by means of cathode-ray tube (CRT) 62 and printer 63 and control means 64.

The above is the moving mechanism for the cutter and the detecting mechanism for moved positions.

Figure 3:
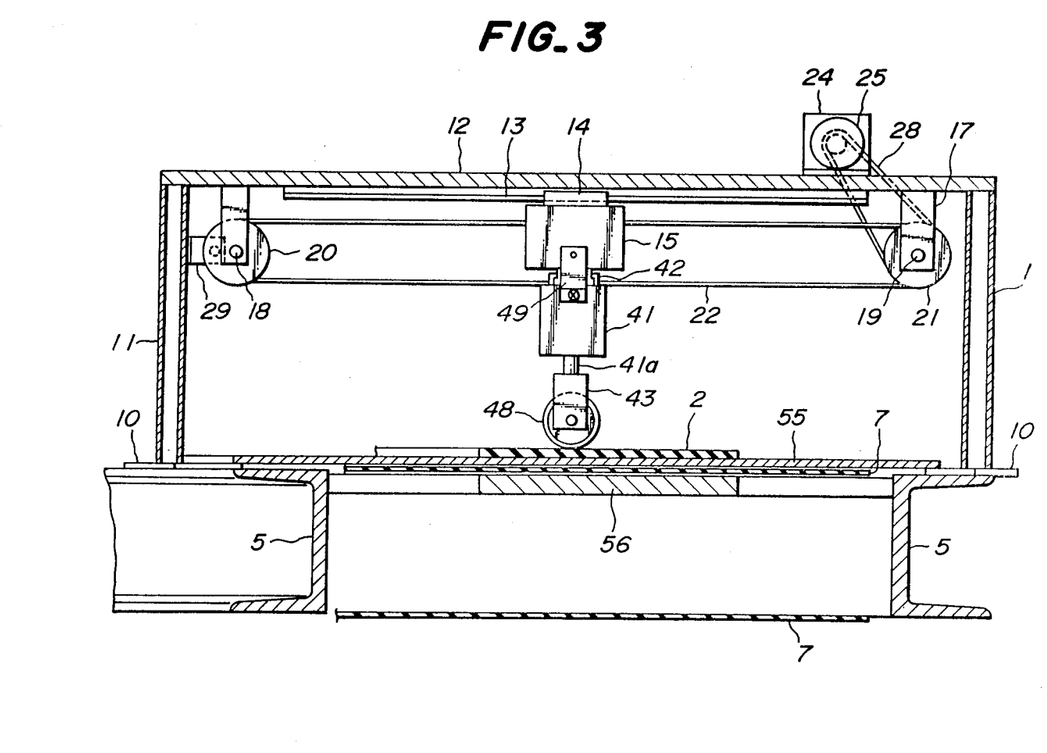
FIG. 3 is a partial sectional view taken along the line III—III in FIG. 1.

On the other hand, on the side of the belt conveyor 4 for transferring the steel breaker member 2, a cutter receiving plate 55 is bridged on the frames 5 on both the sides through the support plate 10 and below and in parallel with the horizontal support plate 12 (FIG. 3).

The cutter receiving plate 55 is arranged above and closely across the conveyor belt 7 so that the steel breaker member 2 is transferred riding on the cutter receiving plate 55.

Moreover, a permanent magnet block 56 is arranged supported by both the frames 5 at a location in opposition to the cutter receiving plate 55 through the conveyor belt 7. The permanent magnet block is also close to an underside of the conveyor belt 7.

Therefore, the steel breaker member 2 on the cutter receiving plate 55 is downwardly attracted to be attached to the cutter receiving plate 55 b means of the magnetic force of the permanent magnet block 56 attracting the steel cords 3 embedded in the steel breaker member 2 so that the configuration of the steel breaker member 2 is properly maintained.

In order to cut the steel breaker member 2, the breaker member 2 transferred by the belt conveyor 4 is stopped when it has advanced a predetermined distance riding on the cutter receiving plate 55 so that a portion of the breaker member 2 to be cut is on the cutter receiving plate 55. At this instant, the portion of the breaker member 2 to be cut is held by the permanent magnet block 56.

Under this condition, the motor 25 is energized so that the traveling support member 15 is moved together with the cutter 48 to a side edge of the steel breaker member 2 and is positioned thereat.

Figure 4:
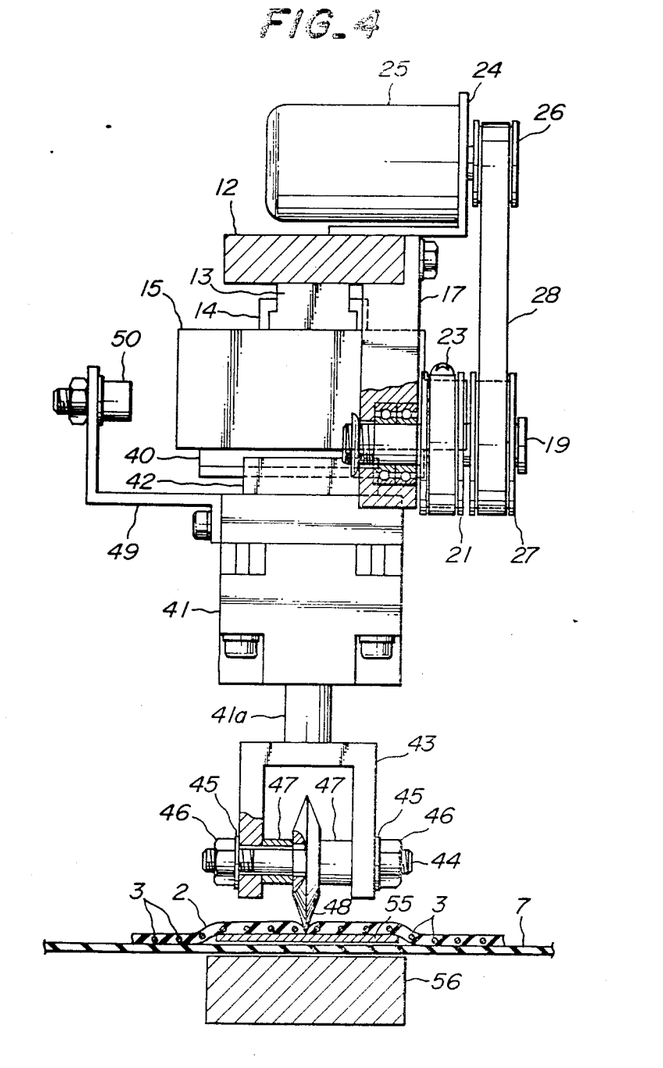
FIG. 4 is an elevation viewed in the direction IV—IV in FIG. 1.

Thereafter, the cutter bracket 43 is lowered by actuating the cylinder 41 so that the cutter 48 is lowered onto the side edge of the steel breaker member 2 held on the cutter receiving plate 55. As a result, a V-shaped cutting edge of the cutter as shown in FIG. 4 penetrates into the steel breaker member 2 and arrives at the cutter receiving plate 55 when the steel breaker member is cut off at its portion in contact with the cutting edge of the cutter 48.

In such a cutting operation, even if a steel cord 3 is positioned in vertical alignment with the edge of the cutter 48, the cord 3 is not cut. The cutter 48 is movable in a direction perpendicular to a traveling direction of the support member 15. It is automatically shifted in the perpendicular direction by an action of a large reaction of the rubber in the proximity of the steel cord 3, and slides laterally with the aid of the rail 40 and the ball slide table. Therefore, when a cutter 48 encounters cord 3 the cutting edge penetrates breaker member 2 between the adjacent steel cords 3 without cutting the steel cords.

Moreover, the V-shaped cutting edge of the cutter 48 penetrates between the adjacent steel cords while outer coatings of both the steel cords are carried along the cutting edge of the cutter 48 so that the steel cords are normally covered by the rubber material of the coatings. In this manner, the breaker member is cut off when the cutting edge of the cutter 48 arrives at the cutter receiving plate 55 so that the steel cords 3 are not exposed at the cut surfaces.

Further, the cutter 48 is on the predetermined traveling line when it is in its raised position. If shifting occurs as above described when lowered, the moving distance in the direction perpendicular to the traveling direction of the support member 15 is detected by the distance sensor 50.

After the cutter 48 has penetrated in the side edge of the steel breaker member 2, the motor 25 is energized to drive the traveling support member 15, so that the cutter cuts the breaker member 2 along the steel cord 3 between the steel cords 3 until the cutting edge of the cutter 48 arrives at a side edge on an opposite side of the breaker member 2 to complete the cutting operation.

As the cutting is effected along the steel cords 3 by the cutter 48, a cut end may be curved if the steel cords 3 are curved. The shifting of the cut end deviated from the predetermined traveling line is detected by the distance sensor 50 at will.

A method of detecting positions of the cutter 48 and analyzing the detected values for reproducing configurations of the cut sections of the breaker on the co-ordinates by means of the digital arithmetic unit 61 will be then explained.

The traveling direction of the cutter 48 is assumed as "Y", and the direction perpendicular to the traveling direction is assumed as "X".

The position of the cutter 48 in the direction Y is detected as digital counted values by the reflection type sensor 30. When periodical counted values are selected from the digital counted values to detect the counted values, the positions of the cutter 48 in the X direction are inputted from the distance sensor 50 into the signal converter 60 for digitization.

The periodical counted values in the Y direction and digital information of the respective counted values in the X direction are memorized in pairs in the digital arithmetic unit 61. These co-ordinate values are shown on a suitable scale in FIG. 7.

Figure 7:
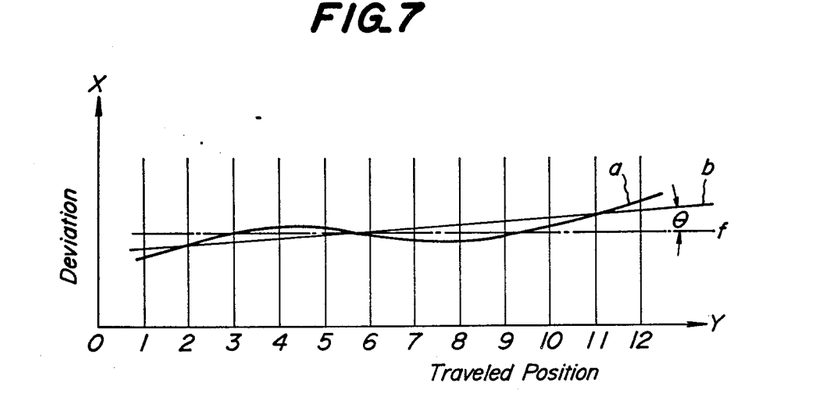
FIG. 7 is an explanatory graph of results of arithmetric operation using the apparatus according to the invention.

The abscissa indicates the traveled positions in the direction Y and the ordinate shows deviations in the direction X. A dot and dash line f in parallel with the abscissa is a predetermined or expected traveling line. On the other hand, a curved line a illustrates one example of arithmetically operated results.

As the abscissa corresponds to the traveled position of the cutter 48 and the ordinate corresponds to the deviated position of a direction perpendicular to the traveling direction, the curved line a indicates the shapes of the cut sections of the breaker formed by cutting.

When a traveling line in the Y direction is substantially equally divided into twelve parts sequentially numbered 1 to 12 from which normal lines extend, a line connecting two intersecting points between the curved line a and normal lines Nos. 2 and 11 is denoted as b which is an approximate straight line of an actual cut line of the breaker member.

An angle $\theta$ made by the approximate straight line b and the predetermined traveling line f is arithmetically operated by the digital arithmetic unit 61.

From the above explanation, with the steel breaker member measured as shown in FIG. 7, the cut end of the steel breaker member 2 deviates by angle $\theta$ with the standard theoretical bias angle. As illustrated in FIG. 7 the points of maximum deviation from the travel line f are in proximity to point 12. The minimum deviations are in proximity with the line f at points 3, 6, and 9. The line a in FIG. 7 is in the shape of an elongated S. The upper limit is located near a terminal position of the traveling support member and the lower limit is near at a starting position or at a center of the travel. The line indicating the cut end of the breaker member is slightly curved at the center.

In this manner, upon completion of cutting of one of the steel breaker member 2, the digital arithmetic unit 61 is actuated to carry out the graphing of the values, judgment of the upper and lower values, arithmetic operation of an approximate straight line of cut end and inclined angle and the like. The results are represented on the cathode-ray tube 62 or printed by the printer 63. The information of the cut ends is fed to the other control means 64.

Figure 8:
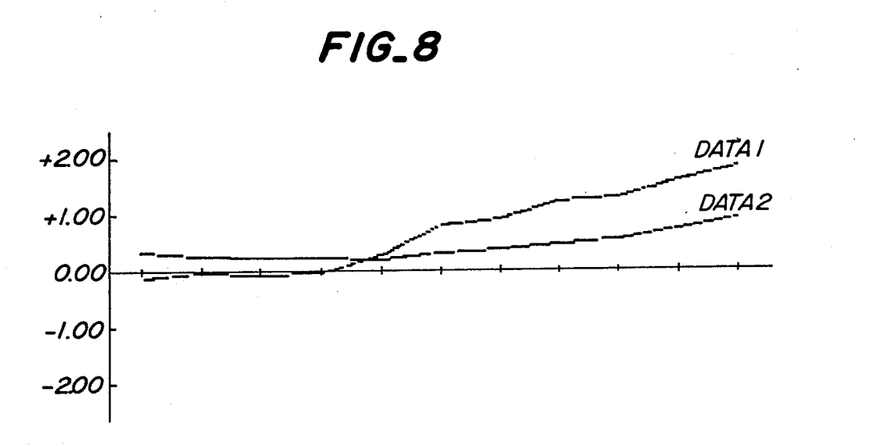
FIG. 8 is a graph of the results actually printed by a printer of the apparatus according to the invention.

FIG. 8 illustrates results actually printed by the printer 63.

In analyzing the result DATA1, the breaker member is cut substantially along the standard line through about one third of the overall length after starting of the cutting but thereafter the deviation of the cutter becomes larger.

As a result, the cut end is curved like a chord, and when cutting is ended, the upper limit value is 1.89 mm and the inclined angle is about 0.39°.

In analyzing the result DATA2, at the commencement of the cutting the cutter falls on a steel cord 3 and is shifted about 0.3 mm, but thereafter the breaker member is cut substantially straight. The inclined angle is very small of the order of 0.1°.

As above explained, the configuration of the cut ends of the steel breaker member 2 is digitally obtained so that the result can be fed-back to the preprocess or utilized for the postprocess or can be applied to various systems, thereby contributing to improve the quality of tires.

Assuming that DATA1 and DATA2 concern leading and trailing ends, respectively, cut lengths of the breaker member at respective measured points can also be obtained by adding feeding amounts of the breaker member.

As can be seen from the above description, according to the invention, configurations of cut ends can be known in cutting sheet materials.

Therefore, a treatment considering the shape of cut ends can be effected in a postprocess. Moreover, if cut ends of breaker members are largely deviated from the standard value, the breaker members may be rejected to improve the quality of products.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A cutting apparatus for sheet-like materials comprising: traveling means having a traveling support member movable above a sheet-like material, cutting means hanging from said traveling support member of the traveling means and movable in directions perpendicular to traveling directions of the traveling support member, first detecting means for detecting positions of said cutting means in the traveling directions of the traveling support member, second detecting means for detecting positions of said cutting means in directions perpendicular to said traveling directions of the traveling support member, and arithmetic means including a signal converter and a digital arithmetic unit for obtaining a cut line of said sheetlike material obtained from the positions of said cutting means on co-ordinates with the aid of signals detected by said first and second detecting means, and further obtaining an approximate straight line of said cut line and an angle of the straight line deviating from a predetermined line along which said cutting means is to be moved.

2. A cutting apparatus as set forth in claim 1, wherein said traveling means comprises a horizontal support plate arranged at an angle substantially equal to a bias angle of the sheet-like material being fed in a longitudinal direction of the apparatus, a guide rail extending in a longitudinal direction of the horizontal support plate and supported thereby for hanging the traveling support member, and driving means for driving said traveling support member in the bias directions of the material.

3. A cutting apparatus as set forth in claim 2, wherein said guide rail is a linear ball slide guide rail on which is slidably fitted a linear ball slide guide supporting said traveling support member.

4. A cutting apparatus as set forth in claim 1, wherein said cutting means comprises a rail extending in directions perpendicular to the traveling directions of the traveling support member and supported on an underside thereof, a slide table slidably fitted on the rail and slidable on the rail in longitudinal directions of the rail, a cylinder hanged from the slide table and having a cylinder rod, and a disk-like cutter rotatably supported by the cylinder rod and extendible and retractable by movements of the cylinder rod.

5. A cutting apparatus as set forth in claim 1, wherein said first detecting means is a reflection type photosensor in opposition to a rotating member rotated for driving the cutting means and said rotating member is provided with a surface facing the photosensor with alternately arranged reflecting portions and nonreflecting portions.

6. A cutting apparatus as set forth in claim 1, wherein said second detecting means is a distance photosensor movable together with the cutting means moved in the directions perpendicular to the traveling directions of the traveling support member.

7. A cutting apparatus as set forth in claim 1, wherein said signal converter is connected between said first and second detecting means and the digital arithmetic unit.

8. A cutting apparatus as set forth in claim 1 wherein said digital arithmetic unit is connected to a cathode-ray tube.

9. A cutting apparatus as set forth in claim 1 wherein said digital arithmetic unit is connected to a printer.

10. A cutting apparatus as set forth in claim 1 wherein said digital arithmetic unit is connected to other control means.

* * * * *